United States Patent [19]

Stewart

[11] Patent Number: 4,727,917
[45] Date of Patent: Mar. 1, 1988

[54] ALTERNATING LUG TIRE
[75] Inventor: David L. Stewart, Uniontown, Ohio
[73] Assignee: The Firestone Tire & Rubber Company, Akron, Ohio
[21] Appl. No.: 500,468
[22] Filed: Jun. 2, 1983
[51] Int. Cl.$^4$ .............................................. B60C 11/03
[52] U.S. Cl. ................................................. 152/209 B
[58] Field of Search ........... 152/209 B, 209 R, 209 D; D12/140, 151

[56] References Cited

U.S. PATENT DOCUMENTS

| D. 107,327 | 12/1937 | Thacher | D12/136 |
|---|---|---|---|
| 2,241,227 | 5/1941 | Wait et al. | 152/209 B |
| 3,603,370 | 9/1971 | Hylbert et al. | 152/209 B |
| 4,383,567 | 5/1983 | Crum et al. | 152/209 B |

FOREIGN PATENT DOCUMENTS 0148602  11/1980  Japan ............................. 152/209 B Primary Examiner—Michael Ball
Attorney, Agent, or Firm—Ronald Brietkrenz

[57] ABSTRACT

An off-the-highway vehicle tire employing long and short lugs alternately disposed about the periphery in a substantially symmetric manner whereby lugs from each side of the tire strike the ground substantially simultaneously thereby minimizing side forces.

4 Claims, 8 Drawing Figures

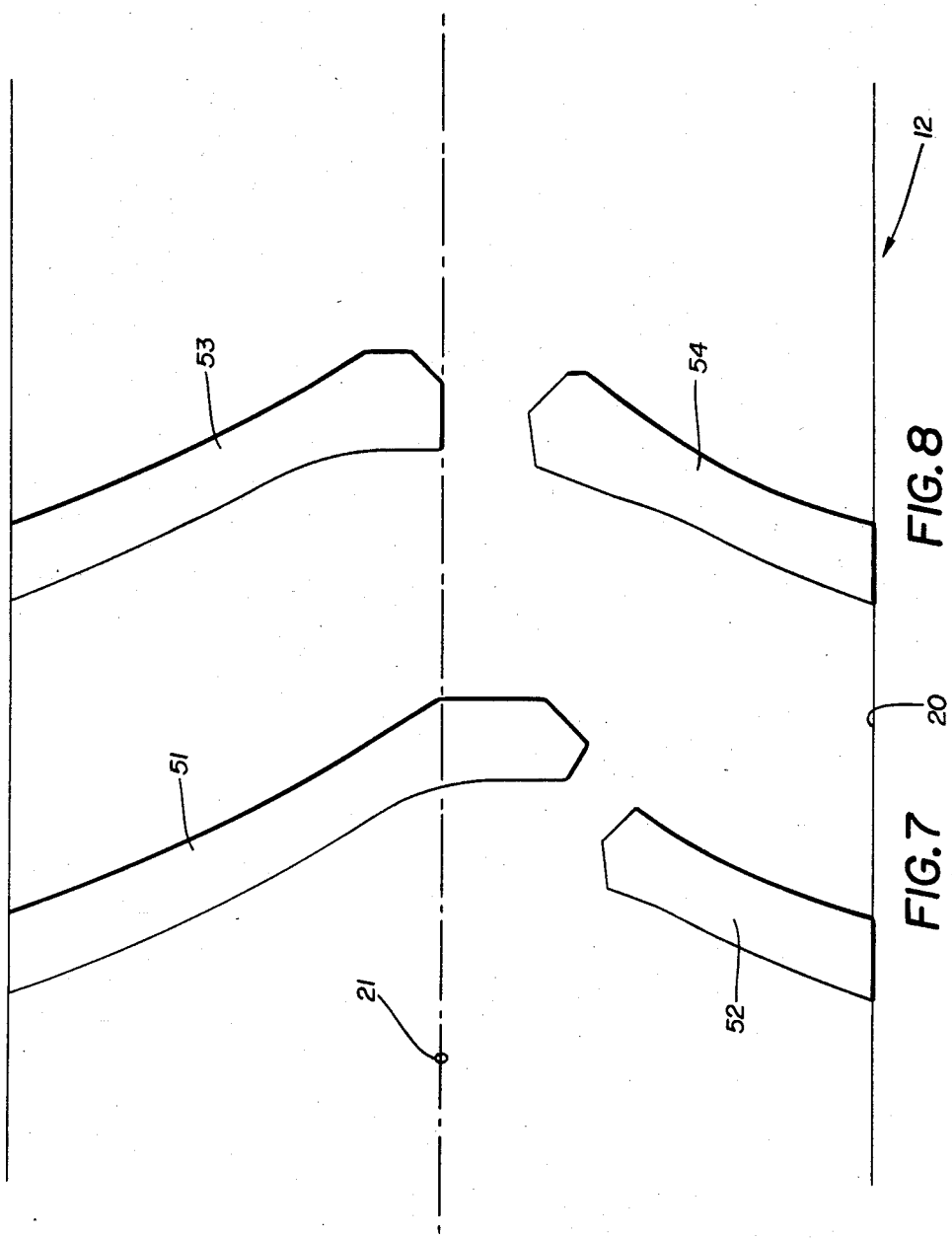

ALTERNATING LUG TIRE

BACKGROUND OF THE INVENTION

1. Field of the Invention

This invention relates to an off-the-highway vehicle tire and more particularly a tread design adapted to provide improved performance characteristics of the vehicle tire. Specifically, the instant invention relates to an alternating lug tread design employing long and short lugs alternately disposed about the periphery of the tire in a substantially symmetric manner whereby lugs from each side of the tire strike the ground substantially simultaneously thereby minimizing the side forces which occur when lugs on either side of the tire are offset.

2. Description of the Prior Art

The use of an alternating lug tread design for tires adapted for off-the-highway vehicles is well known in the art as shown by U.S. Pat. No. Des. 104,492 to Brunner, U.S. Pat. No. Des. 169,668 to Hardeman, U.S. Pat. No. Des. 213,659 to Petroff, U.S. Pat. No. 3,844,326 to Verdier which discloses a tread design having two adjacent, oppositely oriented rows of L-shaped relief elements arranged so as to form wide lateral recesses between their adjacent long arms forming the lateral portions of the tread and narrow central grooves between their adjacent arms forming the central portion of the tread, U.S. Pat. No. 4,131,148 to Bertazzoli, et al, which discloses an agricultural tire tread with symmetrical lugs along each side of the tread and spaced in a repeating and angular pattern from the sidewall of the tire to the centerline, U.S. Pat. No. 4,186,788 to Pommier, which discloses a tractor tire tread having a repeating pattern of opposing and alternating lugs of the same size on each side of the tire whereby each lug extends from the side of the tire and overlaps the centerline of the tire, and Canadian Pat. No. 648,244 to Davis, which discloses an agricultural or earthmover tire tread design embodying a repeating and alternating pattern of lugs wherein the long lug extends from one side of the tire to the other and the short lugs extend to a point just beyond the centerline of the tire tread.

The use of an alternating short and long lug tread design for an off-the-highway vehicle is also well known in the art as disclosed by U.S. Pat. No. 3,603,370 to Hylbert et al, which discloses a rear tractor tire having a tread with alternating long and short lugs on each side, each long lug having an inner portion extending at a low angle with respect to the mid circumferential centerline of the tread and an outer portion extending at a high angle with respect to said mid-circumferential centerline, and each short lug being disposed at a high angle with respect to said mid-circumferential centerline, and Australian Pat. No. 156,404, which discloses an improved method of relugging tires which shows an off-the-road vehicle tire having a series of alternating short and long lugs.

Although the above-noted prior art discloses several designs for off-the-highway type tires, including designs incorporating alternating long and short lugs, the tire designs of the prior art generally cause poor ride characteristics of the tires due to their asymmetrical design which causes adjacent portions of their tread to unevenly contact the ground causing uneven side forces on the tread thus producing a poor ride characteristic of the tire. Specifically, it should be noted that the tread designs of the prior art disclose designs having a generally asymmetrical design which has contact portions of the tread which cause uneven contact of the tread with respect to its supporting surface. The uneven contact of the tread with respect to its supporting surface results in a side force on that portion of the tread that does contact the supporting surface. The side force has a tendency to induce vibration in the tire and generally produce a poor ride characteristic.

There is, therefore, a need for an off-the-highway vehicle tire which provides improved ride characterstics by providing a substantially symmetric tread pattern.

SUMMARY OF THE INVENTION

The present invention relates to an off-the-highway vehicle tire tread having a substantially symmetric repeating pattern of alternating long and short lugs on each side of the tread wherein extension of the short lugs towards the long lugs would provide a substantially symmetric tread pattern.

BRIEF DESCRIPTION OF THE DRAWINGS

FIGS. 7 and 8 are plan views of alternative embodiments of the instant invention.

DESCRIPTION OF AN EXEMPLARY EMBODIMENT

Figure 1:
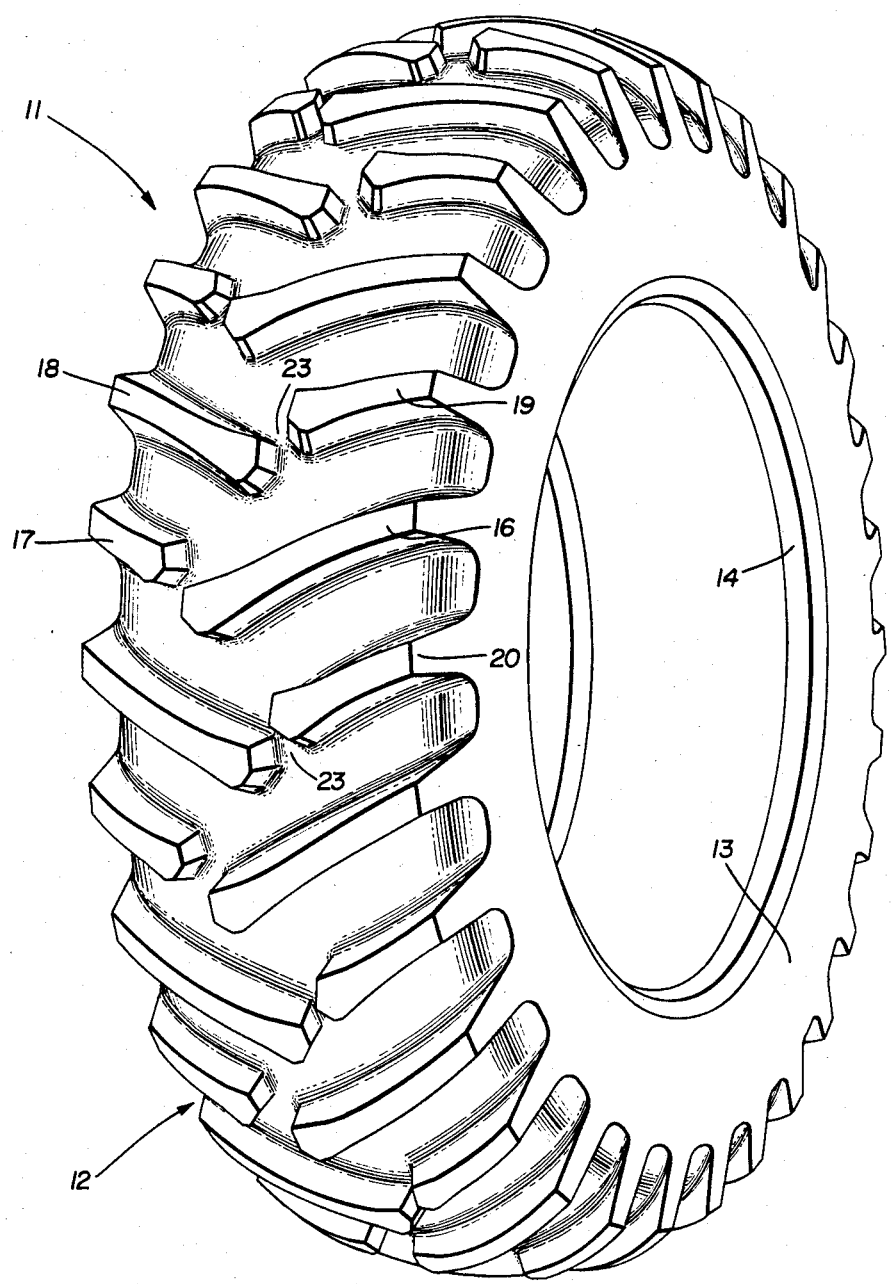
FIG. 1 is a perspective view of the instant invention.

FIG. 1 of the drawings discloses an off-the-highway vehicle tire 11 embodying the instant invention. In the exemplary embodiment, the off-the-highway vehicle tire 11 is adapted to be used in conjunction with an agricultural tractor. It will be appreciated by one skilled in the art, however, that the instant invention may be employed in connection with tires adapted for use with other types of vehicles. The off-the-highway vehicle tire 11 is comprised of a tread portion 12 overlying a carcass 13 which in turn terminates in beads 14 at its inner extremities.

The tread portion 12 is comprised of a series of lugs designated 16–19 which terminate at their outer ends at the lateral edges 20 of the tread portion 12. The lugs 16–19 comprise a pattern of lugs that are repeated around the periphery of the off-the-highway vehicle tire 11 to form the tread portion 12. In the exemplary embodiment, there are 30 lugs terminating on each lateral edge of the tread portion 12. It should be noted that the lateral edges 20 of the tread portion 12 are substantially coincident with the lateral edges of the off-the-highway vehicle tire 11.

The lugs 16–19 are comprised of short and long lugs which are alternately disposed about each side of the tread portion 12 in such a manner that the end of each of the short lugs disposed proximate to the mid-circumferential line of the off-the-highway vehicle tire 11 is disposed proximate to the end of a long lug whose inner end is also proximate to the mid-circumferential line of the tire 11. Each of the long lugs 16, 18 is disposed at a substantially constant angle of 28° from a reference line at right angles to the mid-circumferential line of the tire 11. It will be appreciated by one skilled in the art, however, that a range of angles would be suitable. The angle of the long lugs may be in the range of 23°–31°. The long lugs 16, 18 extend from the lateral edge 20 to a point slightly past the mid-circumferential line of the tire 11. The short lugs 17, 19 are disposed at a substantially constant angle of 26° with respect to a reference line disposed at a right angle to the mid-circumferential line of the tire 11. A range of 23°–31° would be suitable for the short lug angle.

As will be discussed more fully below, each long and short lug combination 16, 17 and 18, 19 is disposed on the tread portion 12 in a manner that produces a substantially symmetrical tread pattern about the mid-circumferential line 21 of the tire 11 when the ends of the short lugs 17, 19 are extended to the inner end of the long lugs 16, 18. That is, the leading point of the long lug-short lug combination will be alternately disposed slightly offset from the mid-circumferential line of the tire 11. Further, due to the symmetrical positioning of the long-short lug combinations 16, 17 and 18, 19, the outer ends of corresponding long and short lugs will be oppositely disposed on the lateral edge 20 about the mid-circumferential line 21.

There is thus described a tread portion 12 having oppositely disposed alternating long and short lugs positioned such that a long lug on one side of the tread portion 12 is directly opposite a short lug on the opposite side of the tread portion 12. The short lug would, if extended toward the center of the tire 11, intersect the end of the long lug, resulting in one continuous lug from the shoulder from the lateral edge on one side to the opposite lateral edge and would be approximately symmetric about the mid-circumferential line 21 of the tire 11. As more fully discussed below, this symmetric feature provides a reduction in side forces as the lugs strike the ground.

The area near the center of the tread between the ends of adjacent lugs is raised with respect to the lower surface 28 to form a tie bar 23. The tie bar 23 strengthens the tread in the area between the ends of the two adjacent lugs and adds rigidity to this area. This added rigidity tends to effectively tie the ends of the two adjacent lugs together thereby providing a smooth transition as the ends of the lugs contact the supporting surface.

Figure 2:
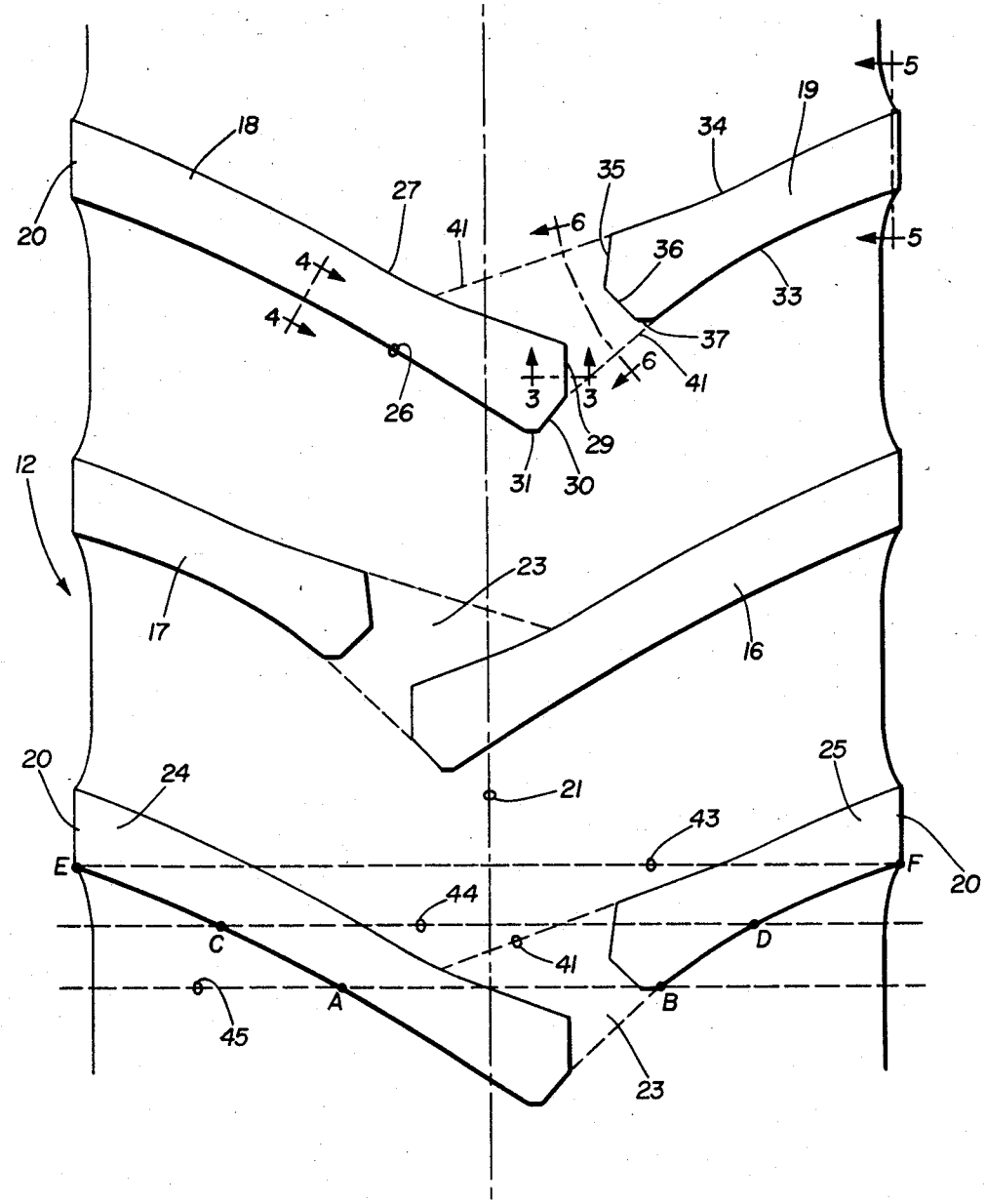
FIG. 2 is a simplified plan view of the tread employed by the instant invention.

Referring now to FIG. 2 of the drawings, there is disclosed a schematic representation of a segment of the tread portion 12 shown in plan view and illustrating the relationship of the lugs. The long lug 18 is generally rectangular in shape and extends from the lateral edge 20 on the outside of the tread portion 12 to a point slightly past the mid-circumferential line 21. In the exemplary embodiment, the long lug 18 extends approximately 16% of its length past the mid-circumferential line 21. It should be noted, however, that a range of 0%–20% extension would be suitable.

The leading edge of the long lug 18 is slightly arcuate and is disposed with respect to a line perpendicular to the mid-circumferential line 21 at an average angle of approximately 28°.

Figure 4:
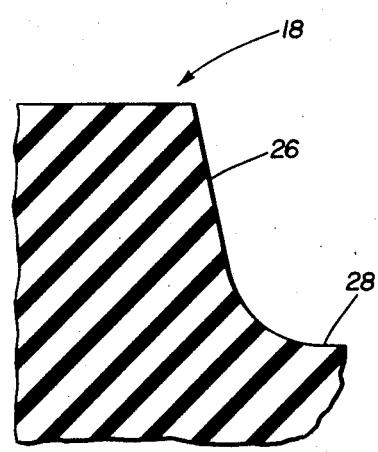

FIG. 4 of the drawings discloses further details of construction of the leading edge 26 disclosing a radius transition between the leading edge 26 and the lower surface 28 of the tread portion 12.

The trailing edge 27 of the long lug 18 extends substantially parallel to the leading edge 26 for approximately three-fourths of the length of the long lug 18. The last one-fourth of the length near the center of the tread 12 is at a greater angle to the mid-circumferential line 21 thereby producing an enlarged lug width of that portion of the long lug 18 which is proximate to the mid-circumferential line 21. There is also a radius transition from the trailing edge 27 to the lower surface 28 of the tread portion 12 similar to that disclosed in FIG. 4 of the drawings.

Figure 3:
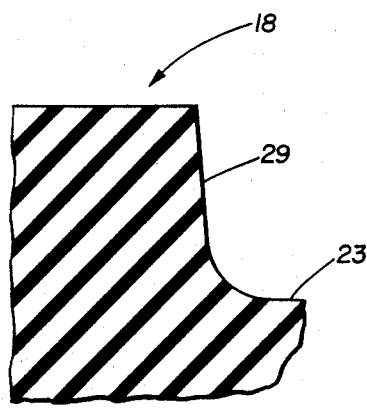
FIGS. 3 through 6 are cross-sectional views taken from FIG. 2 of the drawings, showing further details of construction of the instant invention.

The end of the long lug 18 proximate to the mid-circumferential line 21 is generally composed of two lug faces 29 and 30 which are disposed to produce a slightly pointed end on the long lug 18. The details of construction of the lug face 29, which is very similar to the construction of lug face 30 is shown in more detail in FIG. 3 of the drawings. In particular, there is a radius transition between the lug face 29 and the lower surface 28 of the tread portion 12.

Disposed between the leading edge 26 and lug face 30 is flat 31 which comprises the leading point of the long lug-short lug combination 18, 19.

Disposed opposite to the long lug 18 is short lug 19 extending from the lateral edge 20 of the tread portion 12 to a position approximately two-thirds the distance from the lateral edge 20 to the mid-circumferential line 21 in the direction of the short lug 19.

The short lug 19 includes leading edge 33 which is slightly arcuate and is disposed at an average angle of approximately 26° with respect to a line perpendicular to the mid-circumferential line 21. The trailing edge 34 of the short lug 19 is generally parallel to the leading edge 33 for approximately two-thirds of its length. The portion of the short lug 19 nearest to the mid-circumferential line 21 is at a larger angle to the mid-circumferential line 21, thus producing an enlarged width of the lug near the center of the tread 12. The end of the short lug 19 nearest the mid-circumferential line 21 is generally comprised of two lug faces 35 and 36 which provide a slightly pointed end of the short lug 19. Disposed between the lug face 36 and the leading edge 33 is flat 37.

Figure 6:
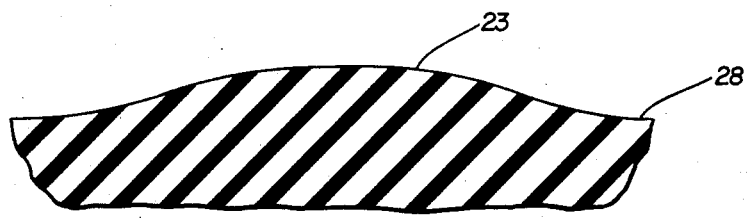

Disposed between the long lug 18 and the short lug 19 is tie bar 23. The reference lines 41 shown in FIG. 2 of the drawings are utilized to demarcate the extent of the tie bar 23 and are not indicative of the configuration thereof. The reference lines 41 have been utilized since their representation by conventional drafting standards would not clearly disclose the construction of the tie bar 23 due to its rounded configuration. Specifically, FIG. 6 of the drawings discloses the tie bar 23 as a rounded raised portion disposed between the long lug 18 and the short lug 19. As may readily be observed from FIG. 6 of the drawings, the tie bar 23 has a generally rounded configuration with a large radius transition between the tie bar 23 and the lower surface 28.

The tie bar 23 generally increases the stiffness between the long lug 18 and the short lug 19 in proximity to the tie bar 23 which provides for a more uniform force on the lugs as the lugs strike the ground. There is thus provided a smooth transition from the time when the flat 31 first contacts the supporting surface to the time that the flat 37 contacts the supporting surface.

Figure 5:
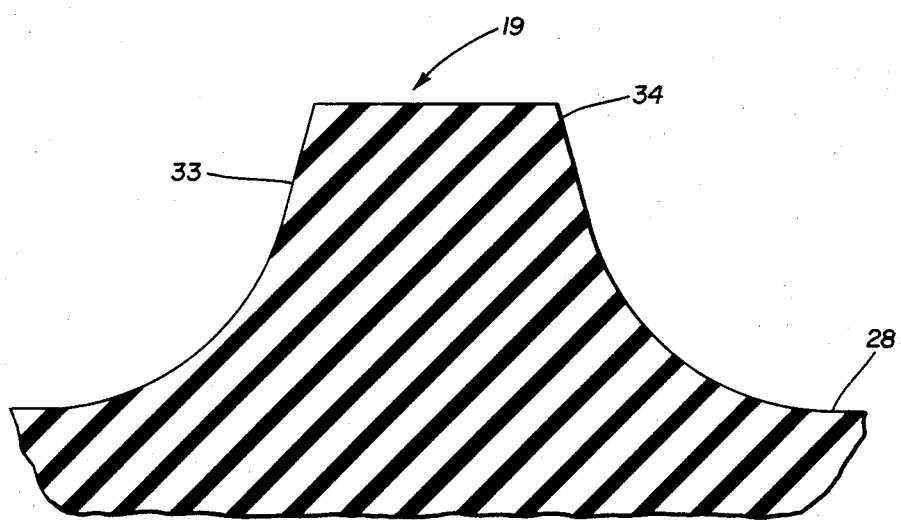

The cross-sectional configuration of the lugs is generally rectangular in configuration with a radius transition between the sides of the lugs and the lower surface 28 of the tread portion 12. FIG. 5 of the drawings more fully discloses the cross-sectional configuration of the short lug 19 disclosed in FIG. 2 of the drawings.

Referring now again to FIG. 2 of the drawings, there are shown reference lines 43, 44 and 45 which are perpendicular to the mid-circumferential line 21. The reference lines 43, 44 and 45 represent the contact lines produced as the tire 11 rotates on the supporting surface. Points A and B on reference line 45 are the points on the leading edge of the short lug-long lug combination 24, 25 that make contact with the supporting surface when the reference line 45 is contacting the supporting surface. It should be noted that points A and B are approximately equidistant from the mid-circumferential line 21. Thus, the forces exerted on the leading edges of the lugs 24, 25 by the supporting surface during the time that the reference line 45 is contacting the supporting surface will be substantially equally disposed about the mid-circumferential line 21. The side components of the forces on the lugs 24, 25 will, therefore, tend to cancel each other with a net effect of substantially no net side forces being exerted on the tire. The absence of side forces reduces vibrations and provides improved performance characteristics of the tire 11.

It may be readily observed that as the tire 11 rotates and the tread portion 12 and its associated lugs contact the supporting surface, the opposite pairs of long and short lugs will contact the ground at substantially the same time due to the opposite positioning of the long lugs with respect to the short lugs. There is thus provided a long lug-short lug pair which has a significant portion thereof generally symmetrical about the mid-circumferential line 21. Further, it should be noted that if the short lug were extended along its axis toward the long lug there would be provided a continuous lug having a generally symmetrical orientation about the mid-circumferential line 21. The generally symmetrical shape of the short and long lugs provides a contact surface which will provide a balancing effect of the forces on the lugs as the tire 11 is rotated causing the lugs disposed on the tread portion 12 thereof to come in contact with the ground surface.

Typical prior art off-the-highway tires employ assymmetrical lug configurations which produce uneven forces on the lugs during the contact between the lugs and the ground surface thereby inducing vibrations in the tire. The instant invention substantially reduces this source of vibration by providing a generally symmetrical tread configuration whereby opposite portions of the lugs contact the ground surface at substantially the same time thereby preventing the shift of forces from side to side and hence, substantially reducing the vibration of the tire while improving the wear characteristics thereof.

Referring now to FIGS. 7-9 of the drawings, there are disclosed alternative embodiments of the instant invention. Specifically, FIG. 7 of the drawings discloses an embodiment having a long lug 51 used in association with a short lug 52. In this embodiment, the end of the long lug 51 proximate to the mid-circumferential line 21 extends substantially past said mid-circumferential line 21 and has a portion thereof substantially parallel to a line perpendicular to said mid-circumferential line. The short lug 52 has been modified by shortening the length thereof to approximately 60% of the distance between the lateral edge 20 of the tread portion 12 and the mid-circumferential line 21.

FIG. 8 of the drawings discloses still another alternative embodiment of the instant invention and is comprised of a long lug 53 and a short lug 54. In this alternative embodiment, the long lug 53 extends from the lateral edge 20 to the mid-circumferential line 21 and does not substantially pass therethrough. The short lug 54 extends approximately 80% of the distance from the opposite lateral edge 20 the mid-circumferential line 21.

It should be noted that the lugs disclosed in FIGS. 7-8 are preferably at an angle relative to a line perpendicular to the mid-circumferential line 21 of approximately 28°. Further, the details of construction thereof are similar to those described in connection with the exemplary embodiment disclosed in FIGS. 2-6 of the drawings. It will be appreciated by one skilled in the art that the tread configuration disclosed in FIGS. 7 and 8 is transposed and repeated to form alternate oppositely disposed pairs of short and long lugs about the tread portion 12 of the vehicle tire 11.

There has thus been disclosed an off-the-highway vehicle tire having alternately disposed opposite pairs of short and long lugs substantially symmetrically disposed about a mid-circumferential line of the tire wherein the lugs are disposed at a substantially constant angle with respect to the mid-circumferential line to produce a tire having improved performance characteristics and, in particular, having improved vibration resistance due to the symmetric manner in which the lugs of the tire contact the supporting surface.

It will be apparent to those skilled in the art that various modifications and additions may be made in the instant invention without departing from the essential features thereof, which are intended to be defined and secured by the appended claims.

What is claimed is:

1. An off-the-highway vehicle tire comprising:
    (a) carcass means having a tread area for receiving a tread means;
    (b) tread means comprising:
        (i) a first lug extending transverse to a mid-circumferential line about said tire, said first lug extending from the edge of said tread area through said mid-circumferential line, and
        (ii) a second lug extending transverse to a mid-circumferential line about said tire said second lug extending from the opposite edge of said tread area to a point short of said mid-circumferential line of said tire, wherein said second lug is disposed directly opposite said first lug such that said first and second lugs are substantially symmetrical about said mid-circumferential line;
    (c) tie bar means disposed between said first and second lugs, wherein said first lug is at a substantially constant angle with respect to said mid-circumferential line.

2. In an off-the-highway vehicle tire having a plurality of alternating short and long lugs oppositely disposed about the periphery of said tire, having a mid-circumferential line, the improvement comprising:
    (a) substantially symmetrical positioning of said short and long lugs about said mid-circumferential line;
    (b) tie bar means disposed between said short and long lugs, wherein a substantial portion of one of said lugs is directly opposite a portion of one of said long lugs, said portions of said short and long lugs being equidistant from said mid-circumferential line, and wherein said long lug is at a substantially constant angle with respect to said mid-circumferential line.

3. A pneumatic tire for tractors and like vehicles comprising:
    (a) a casing;
    (b) a first set of lugs disposed about the periphery of said casing and angularly disposed with respect to the mid-circumferential line of said casing and extending from the shoulder of said casing to a point on the same side of said mid-circumferential line, wherein said lugs are at a substantially constant angle with respect to said mid-circumferential line; and (c) a second set of lugs alternately disposed between each of said lugs of said first set of lugs and disposed about the periphery of said casing angularly disposed with respect to the mid-circumferential line of said casing and extending through said mid-circumferential line, wherein said lugs are at a substantially constant angle with respect to said mid-circumferential line whereby oppositely disposed adjacent first and second lugs provide substantially the same contact surfaces.

4. The pneumatic tire of claim 3 further comprising tie bar means disposed between said first and second lugs.

* * * * *